(12) United States Patent
Soquet

(10) Patent No.: US 10,956,138 B1
(45) Date of Patent: Mar. 23, 2021

(54) AUTOMATIC CONFIGURATION OF AN EXECUTION ENVIRONMENT

(71) Applicant: Moddable Tech, Inc., Menlo Park, CA (US)

(72) Inventor: Patrick Soquet, Chastre (BE)

(73) Assignee: Moddable Tech, Inc., Menlo Park, CA (US)

(*) Notice: Subject to any disclaimer, the term of this patent is extended or adjusted under 35 U.S.C. 154(b) by 0 days.

(21) Appl. No.: 16/169,713

(22) Filed: Oct. 24, 2018

Related U.S. Application Data

(60) Provisional application No. 62/576,734, filed on Oct. 25, 2017.

(51) Int. Cl.
| | | |
|---|---|---|
| G06F 8/30 | (2018.01) | |
| G06F 8/41 | (2018.01) | |
| G06F 9/50 | (2006.01) | |
| G06F 9/445 | (2018.01) | |

(52) U.S. Cl.
CPC .............. *G06F 8/4435* (2013.01); *G06F 8/31* (2013.01); *G06F 8/427* (2013.01); *G06F 9/44505* (2013.01); *G06F 9/5016* (2013.01)

(58) Field of Classification Search
CPC .......... G06F 8/4435; G06F 8/31; G06F 8/427; G06F 9/44505; G06F 9/5016
See application file for complete search history.

(56) References Cited

U.S. PATENT DOCUMENTS

| | | | | |
|---|---|---|---|---|
| 5,933,646 | A * | 8/1999 | Hendrickson | G06F 8/71 713/100 |
| 6,247,175 | B1 * | 6/2001 | Ledford | G06F 8/4435 717/107 |
| 8,387,032 | B1 * | 2/2013 | Goldman | G06F 8/54 717/110 |
| 8,635,590 | B1 * | 1/2014 | Ogilvie | G06F 9/44521 717/110 |
| 8,856,186 | B1 * | 10/2014 | Li | G06F 12/0253 707/800 |
| 9,436,449 | B1 * | 9/2016 | Chandnani | G06F 16/9574 |
| 2003/0208743 | A1 * | 11/2003 | Chong | G06F 8/30 717/106 |
| 2004/0128660 | A1 * | 7/2004 | Nair | G06F 8/433 717/156 |
| 2004/0215700 | A1 * | 10/2004 | Shenfield | H04L 69/329 709/201 |
| 2007/0106946 | A1 * | 5/2007 | Goetz | G06F 8/38 715/744 |
| 2015/0234652 | A1 * | 8/2015 | Naveh | G06F 8/4435 717/121 |

(Continued)

*Primary Examiner* — Ziaul A Chowdhury
(74) *Attorney, Agent, or Firm* — intellipat; Edward W. Scott, IV

(57) ABSTRACT

A computing device and automatic method for reducing memory usage in a device having an execution environment, such as one using an interpretive scripting engine. Application code is analyzed to determine unused features. Based upon this analysis, a build process is configured to omit the unused features. Then, the execution environment is built for the application code that excludes features not used by the application code. The application code and the execution environment can then be loaded into a deployment device for execution of the application code by the execution environment.

27 Claims, 5 Drawing Sheets

(56) References Cited

U.S. PATENT DOCUMENTS

| | | | | |
|---|---|---|---|---|
| 2016/0019071 A1* | 1/2016 | Webb | ................. | G06F 8/31 |
| | | | | 719/331 |
| 2016/0021121 A1* | 1/2016 | Cui | ................. | G06F 21/54 |
| | | | | 726/1 |

* cited by examiner

Automatic Script Engine Configuration

100

Script Analysis

110

AUTOMATIC CONFIGURATION OF AN EXECUTION ENVIRONMENT

CROSS REFERENCE TO RELATED APPLICATIONS

This application claims the benefit of U.S. Provisional Patent Application No. 62/576,734 entitled "Automatic Executive Configuration" filed Oct. 25, 2017.

FIELD OF THE INVENTION

The present invention is related to reducing memory usage in devices with limited resources implementing an execution environment, such as a script engine used for executing a script application.

BACKGROUND

Microcontroller units (MCU's) are used for a variety of applications such as computer peripherals, home automation devices (internet of things—IOT), automotive devices, industrial automation, environmental monitoring, etc. . . . Many MCU deployments suffer from limited resources such as memory (e.g. RAM, SRAM, ROM, EEPROM, hard drives, etc. . . . ) storage space. Memory size is sometimes so limited to help reduce cost because larger memory is generally more expensive. Common EEPROM (electrically-erasable read only memory or "flash" memory) sizes used in typical MCU devices as of this writing vary from 256 KB to 1 MB. Often, this flash memory is the only storage available on the device, so it must hold all software and required data (e.g. user interface assets) in addition to any user generated data (e.g. Wi-Fi configuration, network service credentials, stored sensor readings, scheduling data, etc.). Often developers of the software that must fit into these devices find that they have run out of space, and must take steps to free space. In short, there is a motivation to reduce the memory used in such deployments.

While the software for MCUs is sometimes written in C or C++ and implemented natively, the use of scripting languages to provide an execution environment for an application, such as scripts adhering to the ECMAScript standard (e.g. JavaScript the programming language used in many web browsers), for these devices is increasingly desirable and practical. The reasons for this demand include:
  The ECMAScript language has proven to increase programmer productivity for many tasks;
  Thanks to the success of ECMAScript on the web, mobile, and web servers there is a large pool of skilled ECMAScript developers;
  The compiled ECMAScript bytecode to perform an operation is often more compact than the equivalent machine instructions.
  Because it is a scripting language, code written in ECMAScript tends to be more reliable because certain classes of errors, such as reading or writing to invalid address and forgetting to free memory, are unlikely to occur; and Because these errors are prevented by the language, software written in ECMAScript has fewer opportunities for errors that lead to security problems and leaks of private user data.
The ECMAScript language is big. The 2017 edition of the language specification is approximately 1500 pages. A complete ECMAScript engine that conforms to the specification, such as XS by Moddable Tech, has a footprint that is too big to fit in 256 KB. It does fit into 1 megabyte of memory, as is typical in MCU deployments, though relatively little space remains for application code and assets.

One solution to reduce the memory size of an ECMAScript engine is to remove features of the ECMAScript language itself. This process could result in an ECMAScript engine that could lack features an application developer would use, breaking their code. Consequently, this subset no longer strictly conforms to the ECMAScript standard.

The process of removing features could be performed such that the deployed ECMAScript engine matches the needs of a deployed application, with only unused functionality being removed. This may be done manually in circumstances in which the application(s) to be executed are known and have a finite set of features which are used, rather than a script engine which is required to run any script presented to it and consequently must include all functionality. This approach is error-prone. On one hand, the developer may unintentionally remove functionality that a script relies on. This will generally only be detected when the script runs and invokes the removed feature. On the other hand, because some aspects of the ECMAScript language are subtle, the developer may not recognize that certain features are unused. The consequence of this is a virtual machine deployment that uses more memory than is strictly required. This approach is also time consuming, as dozens of language constructs and each of the over four hundred functions built into the standard ECMAScript language must be considered. If the only language features removed are unused by any scripts, their removal is unobservable to those scripts and therefore the resulting engine remains conformant to the language specification for all practical purposes.

There therefore exists a need for more efficient memory usage in an execution environment, such as that provided by a scripting language, that provides full functionality for the application without incurring errors caused by manual configuration of the execution environment.

SUMMARY

Disclosed is a device and automatic method for reducing memory usage in a device having an execution environment, such as one using an interpretive scripting engine. The method is performed in a computer system by analyzing application code to determine unused features. Based on the analysis, the process configures a build process to omit the unused features. This can be done in a number of ways, including, but not limited to, generation of a source code file which is built along with the engine code, a make file, compiler directives, command line options, etc. . . . . Then, the execution environment is built for the application code without the features unused by the application. The application code and the execution environment can then be loaded into a deployment device for execution of the application code by the execution environment at deployment device's runtime.

Deployment devices are also described herein which contain a customized scripting engine (e.g. one stored in memory or on a network for downloading into a device) according to one or more applications which are targeted to the deployment device using the above processes and devices.

Unused features of the execution environment can be any of the following: a function; an object; a class; a language construct; a module; or a virtual machine op-code. In other execution environments with other features, those features can be analyzed and excluded as well if desired. The scripting engine can be any scripting language, for example, an ECMAScript compliant language such as JavaScript.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

For purposes of this discussion of embodiments of the present invention, the term "application" in this disclosure is broadly construed to mean any application program that requires an execution environment for operation at runtime. In the described embodiments, an application is a set of script modules and/or scripts, wherein "modules" and "scripts" are modules and scripts are as defined in the ECMAScript standard which are interpreted executed by a script engine or virtual machine (VM) at runtime. The operation of this set of modules and/or scripts may be an application on a mobile device, computer, or MCU for an application such as a web server, device driver, plug-in, etc. No specific software architecture, hardware architecture, functionality, or user operation is implied. While JavaScript and ECMAScript are described herein, the teachings of this invention are applicable to other scripting languages or other usages where an application is stored in a device along with the execution environment that is used to execute the application.

Embodiments of this invention reduce the size of a script engine by automatically matching the functionality contained in the script engine to that required by the application it is expected to run in a deployment. The result is a smaller script engine in the deployment. The changes are undetectable (unobservable in ECMAScript parlance) by the application executed in the deployment since the missing functionality is never invoked.

Precisely aligning the capabilities of a script engine deployment with the requirements of only the application it will run has the benefit of reducing the memory space (e.g. EEPROM) in the device required for storage of the application and script engine. While possible to perform this alignment manually, as discussed above, doing so is impractical. Consequently, automatic alignment of the script engine to an application is described in various embodiments of the present invention as follows.

Figure 5:
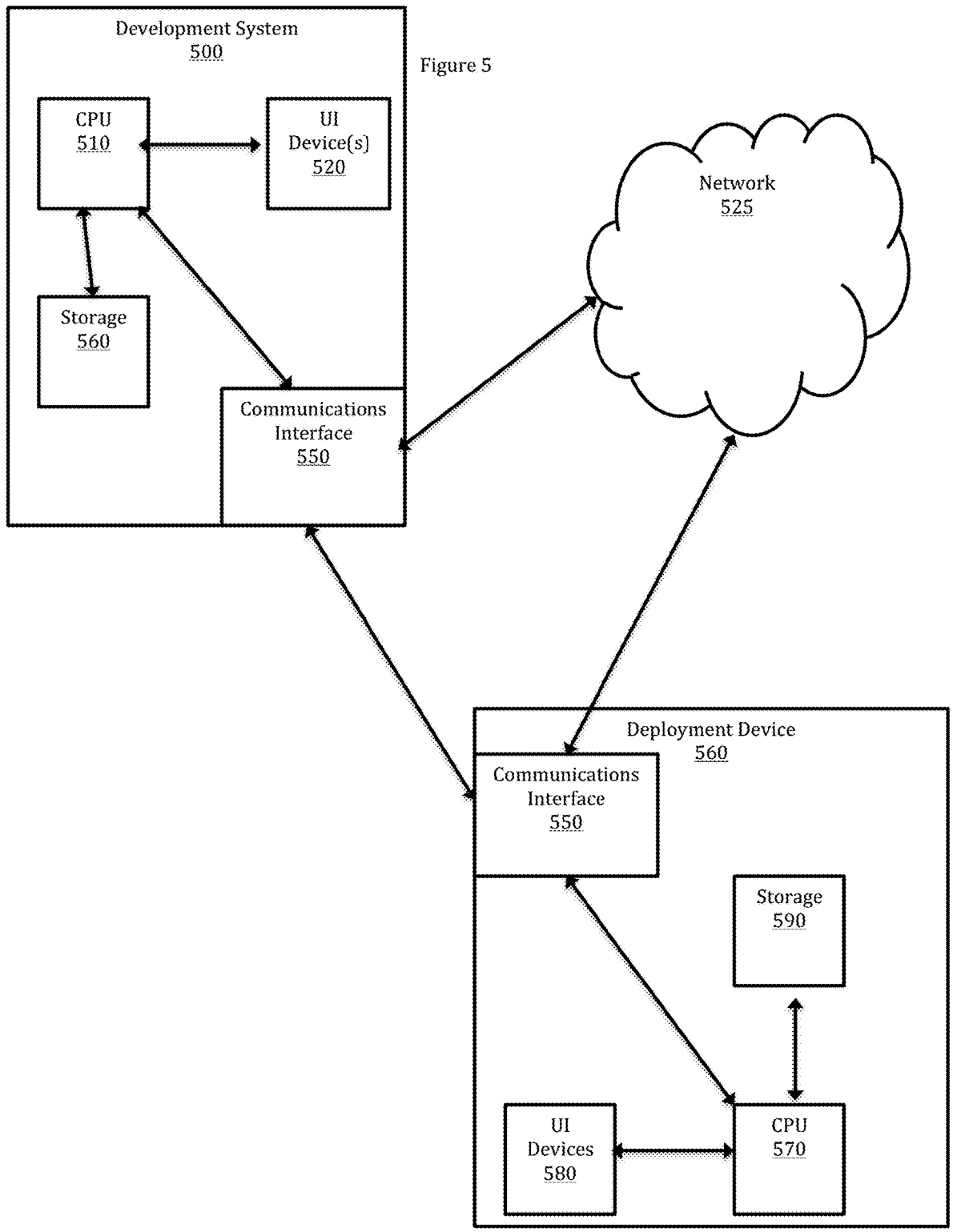
FIG. 5 shows a block diagram of a development and deployment system in embodiments of the present invention.

While no specific hardware or software architecture is described herein, it can be appreciated by one skilled in the art that a development system, such a full-featured computer system 500 shown in FIG. 5, with all the necessary storage and user-interface functionality may be used to implement various embodiments of the present invention. A development system 500 will usually include a central processing unit 510, user interface (UI) devices 520 (display(s), keyboard, pointing device(s), etc. . . . ), a communication device 550, and storage 560 (volatile and non-volatile, such as RAM, SRAM, ROM, hard drives, SSD's, etc. . . . ). This device will be operative along with appropriate software tools and frameworks, such as editors, compilers, linkers, etc. . . . is used to develop and implement the functions described herein. Such a system can be component-based, or monolithic, such as a system on a chip or SOC. It can be further appreciated that the methods described in the present disclosure can be and often are implemented in software which can be stored in some sort of storage medium (local or remote, such as on a network 525) and once retrieved from storage, executed by the central processing unit 510. Thus, the process can be considered functional units which can be implemented as software within a hardware device, such as a programmable computer, or discrete hardware, according to implementation.

When a development system implements various embodiments of the present invention, completed deployment code, in these embodiments the script application and scripting engine, can be stored for use (either locally into storage 590 of a deployment device 560), or remotely (e.g. over a network 525) for retrieval by the device 560 at such time is it is required. Such a deployment device 560 is also a computing device, albeit with perhaps less functionality than a full featured computer system (e.g. it may not have a full complement of user interface devices 580—display, a keyboard, etc. . . . according to application). It can also be a SOC (which contains an almost complete computer—CPU, volatile memory, non-volatile memory, etc. . . . ) programmed to perform the functions described in this disclosure herein. Such an deployment device 560 may often have limited resources, such as local memory or storage 590 (non-volatile and/or volatile), into which the completed deployment code is stored persistently for execution within the deployment device. In another embodiment, a deployment device may contain volatile memory in which the deployment code is loaded dynamically from a communications interface 550 coupled to a network 525, such as a wireless or wired network ultimately coupled to the internet.

Overview

Figure 1:
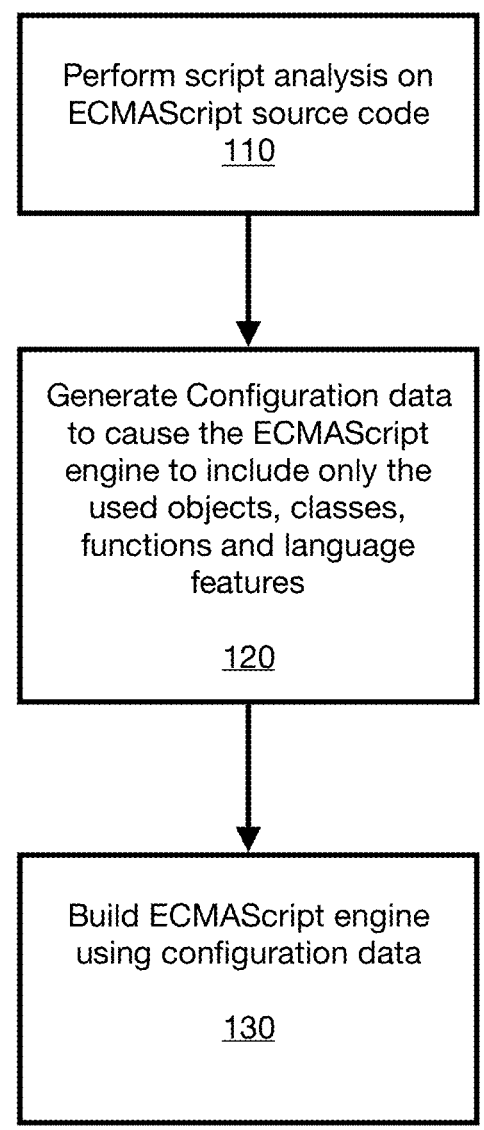
FIG. 1 shows a method of an embodiment of the present invention.
Figure 2:
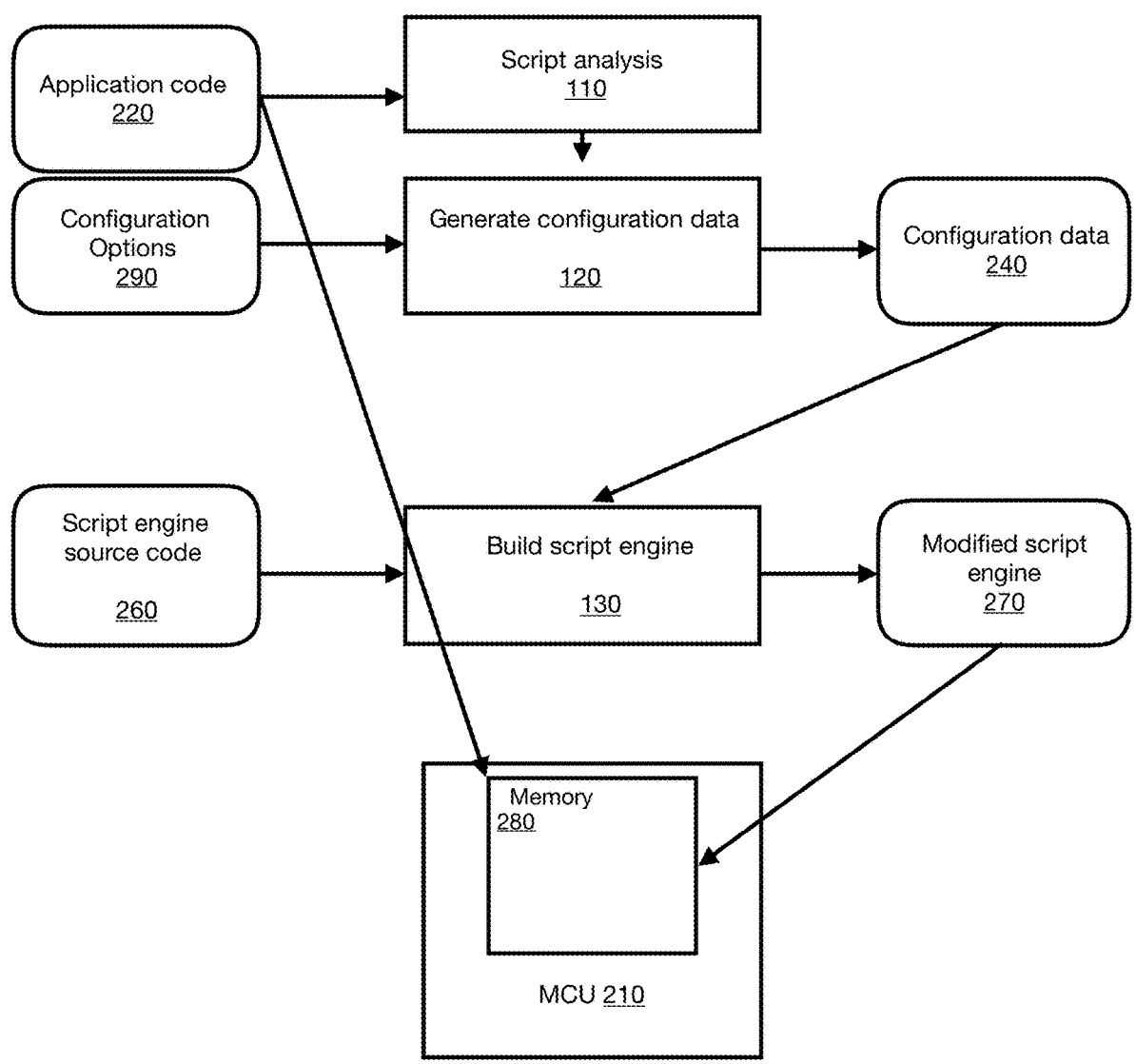
FIG. 2 shows data flow from a development system to an MCU in an embodiment of the present invention.

As shown in FIGS. 1 and 2, process 100 automatically tailors an ECMAScript engine for an MCU deployment device 210 to the application 220 it is expected to run. This process is performed within a development system. It achieves this by:

1) first, performing script analysis 110 by analyzing the content of the ECMAScript application source code 220;

2) second, applying the results of the analysis to generate 120 configuration data 240 for building the ECMAScript engine; and 3) finally, building (compile and/or link as necessary) 150 the ECMAScript engine source code 260 using the configuration data 240 to generate an executable modified script engine 270.

Once process 100 is complete, the application script code 220 and the modified script engine 270 can be stored in memory 280 as one or more computer program products. This allows the script engine 270 to execute the application script 220 by DEVICE 210 at runtime. In some embodiments, application script code 220 is converted into byte codes before storage in DEVICE 210 rather than being stored as script source code. In other embodiments, the explicit configuration step can be collapsed into the analysis process or build process 150 with the configuration data 240 being passed as individual instructions to the build process 150 rather than a defined file, depending on how the processing is implemented. Other implementations of analysis, configuration and building are contemplated within the spirit and scope of the present invention.

The following describes the steps of this process in detail.

Application Code Script Analysis

Figure 3:
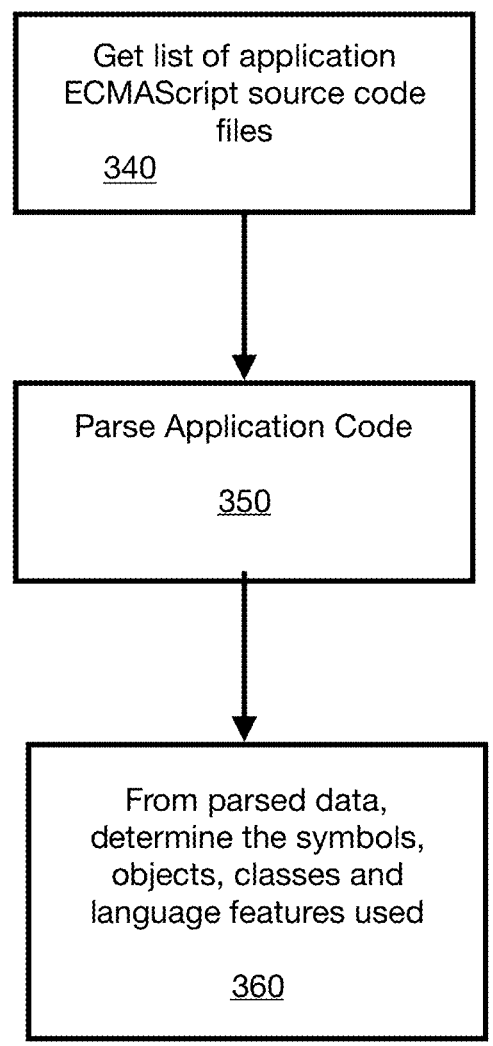
FIG. 3 shows a more detailed view of the analysis process used in an embodiment of the present invention.

A more detailed view of the script analysis process 110 of one embodiment of the present invention is shown on FIG. 3. First, at step 340, the ECMAScript source code 220 is retrieved for the application. Then, the application source code 220 is parsed 350 based on the rules described in the ECMAScript specification into a form that is convenient for analysis. In one embodiment, this form is a parse tree such as an Abstract Syntax Tree (AST).

Once analysis 110 is complete, the parse tree is then analyzed, step 360, in embodiments of the present invention, to determine the following:

Symbols which are both defined and referenced (examples include slice, getUTCFullYear, propertyIsEnumerable, etc.)

ECMAScriptObjects that are used (examples include Atomics JSON, etc. . . . )

Classes that are used (examples include Promise, BigInt, Reflect, etc. . . . )

ECMAScriptLanguage constructs that are used (examples include for-of loop, for-in loop, strict mode, sloppy mode, generators, async functions, etc.)

Configuration Generation

Based on the script analysis, configuration data 240 is generated, step 120, to allow only the objects, classes, functions, and language features that are used by the application 220 to be included in the build of the modified script engine 270. The following is a list of the kinds of items in the script engine that may be eliminated in this embodiment of the present invention:

functions
classes
objects
language constructs

By eliminating unnecessary (unused) features of the script engine, memory is conserved. In other embodiments of the present invention, the following may also be eliminated:

modules
virtual machine op-codes

Of course, this list of features is not considered to be exhaustive. In other execution environments with other features not listed here or added at a time after this writing and known to those skilled in the art, those features can be analyzed and excluded as well if desired. In addition, it can be appreciated by one skilled in the art that multiple applications can be analyzed by this process with multiple AST's in order to obtain the desired set of unused features of a given execution environment. Once these AST(s) have been generated, they can be processed into unified configuration data 240.

The configuration data 240 that is generated in one embodiment of the present invention is at least one file of source code (e.g. mc.xs.c) containing modified data structures (e.g. C data structures) from those contained in the original script engine source code 260. This allows the exclusion of features of the script engine not used by the application. This file is used as an input to the build process 150 along with the original script engine source code 260. Other embodiments of build processes could be implemented in various other ways (command line options, make files, batch files, build directives, multiple files, data base, etc.). In yet other embodiments, configuration data can be communicated with the build process through discrete commands to the build process or similar methods, and obviate the need for a separate configuration file.

Figure 4:
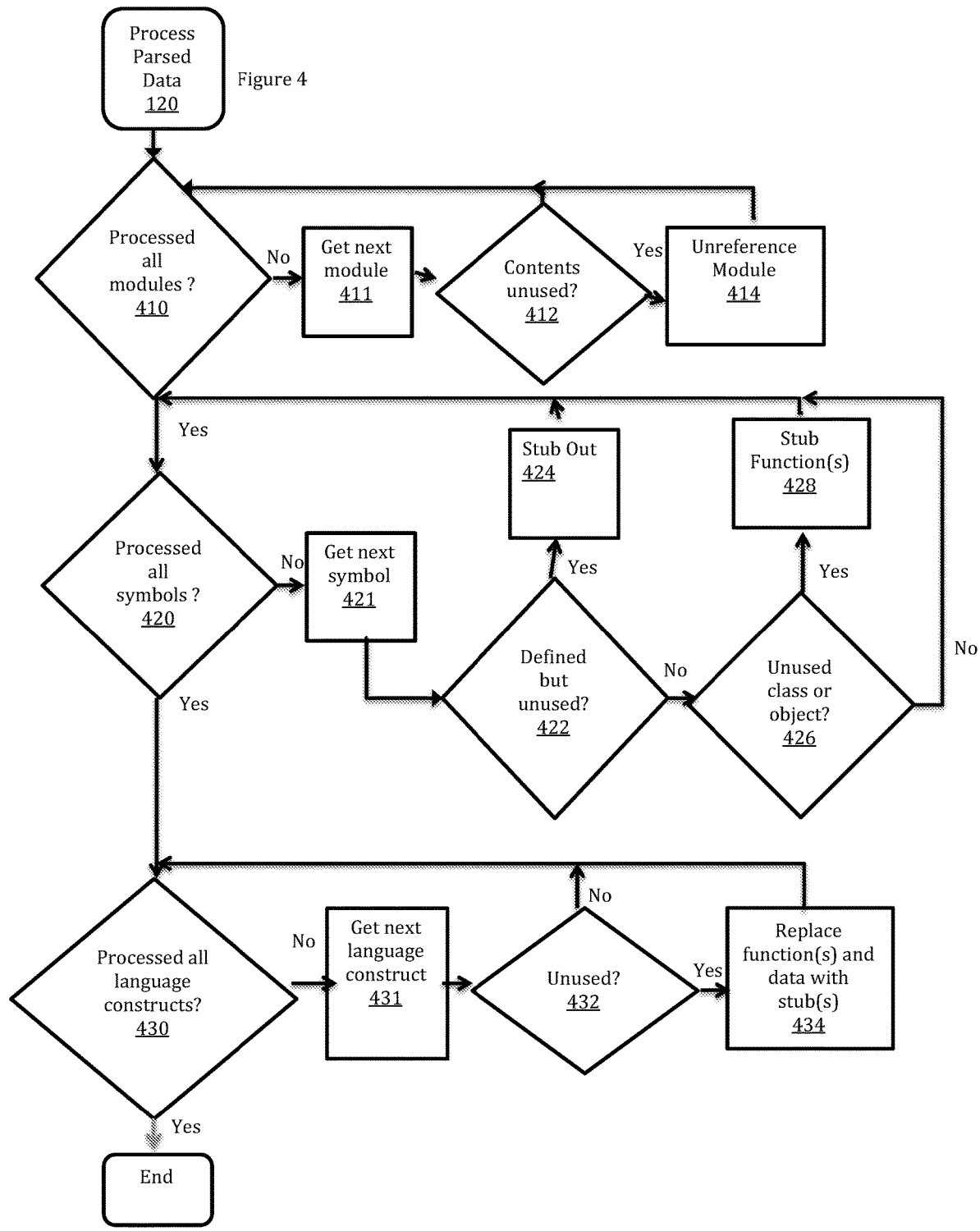
FIG. 4 shows a more detailed view of the configuration process used in an embodiment of the present invention.

Configuration data generation process 120 is shown in more detail in FIG. 4. For any modules 410, 411 whose contents are unused 412, their contributions to the analysis are discarded, step 414. For example, if module XYZ has the sole reference to the JSON object from the set of scripts analyzed, and the contents of module XYZ are not referenced by the root or any other script, then JSON is also unreferenced.

For each symbol 420, 421 which is defined but not referenced (e.g. match) 422, the configuration data causes the implementation of any function defined by this symbol, native code in the present implementation of XS, (e.g. Array.prototype.match, RegExp.prototype.match) to point to a stub function 424 instead of its true implementation. For classes or objects which are unused (e.g. Promise or Atomics) 426, the configuration data causes all functions on the object or class to point to a stub function instead of their true implementations.

For language constructs 430, 431 which are unused (e.g. async or for-of) 432, the configuration data causes the functions and data used to support those constructs to be replaced with stubs 434. In an ECMAScript engine that uses byte codes, the may code supporting certain op-codes of the ECMAScript to be eliminated. For example, if the application does not perform a multiply operation, the multiplication op-code may be eliminated.

ECMAScript Engine Compilation/Build

Once the configuration has been generated, it is used in the building 150 of the modified ECMAScript executable engine 270. The modified engine 270 contains only those capabilities required to run the analyzed application 220.

For example, the unmodified XS ECMAScript engine uses the following C array to reference certain language features.

```
const        txBehavior*gxBehaviors[XS_BEHAVIOR_COUNT]={
   &gxOrdinaryBehavior,
   &gxArgumentsSloppyBehavior,
   &gxArgumentsStrictBehavior,
   &gxArrayBehavior,
   &gxEnvironmentBehavior,
   &gxGlobalBehavior,
   &gxModuleBehavior,
   &gxProxyBehavior,
   &gxStringBehavior,
   &gxTypedArrayBehavior
};
```

The preceding array is fully populated, corresponding to an ECMAScript engine deployment which supports all of these features. The following instance of the same array is generated for an application which does not use the "sloppy arguments" and "proxy" language features.

```
const        txBehavior*gxBehaviors[XS_BEHAVIOR_COUNT]={
   &gxOrdinaryBehavior,
   C_NULL,
   &gxArgumentsStrictBehavior,
```

&gxArrayBehavior,
&gxEnvironmentBehavior,
&gxGlobalBehavior,
&gxModuleBehavior,
C_NULL,
&gxStringBehavior,
&gxTypedArrayBehavior
};

Because gxBehaviors here does not reference gxArgumentsSloppyBehavior and gxProxyBehavior, during build process 150, the native code linker is able to exclude support for the corresponding language feature(s) from the ECMAScript engine.

In another example of an embodiment of the present invention, the following C data structure represents a "slot" used by the ECMAScript engine. One slot for each function is defined in the configuration data. The following slot is for the ECMAScript global function parseInt which is implemented by a C function named fx_parseInt:
{(txSlot*)&gxHeap[455], −32705, 0x8f, XS_CALL-BACK_X_KIND, {.callback={{x_parseInt, NULL} }}, Similarly, the following slot corresponds to the global ECMAScript function isNaN:
{(txSlot*)&gxHeap[523], −32707, 0x8f, XS_CALL-BACK_X_KIND,
{.callback={fx_isNaN, NULL} }}, If the analysis phase determines that isNaN is unused by the application rather than using fx_isNaN, the name of the C function that implements isNaN, the configuration data contains a reference to the C function fxDeadStrip, which displays an error when invoked at runtime:
{(txSlot*)&gxHeap[523], −32707, 0x8f, XS_CALL-BACK_X_KIND,
{.callback={fxDeadStrip, NULL} }}, Because fx_isNaN is not referenced, the linker is able to exclude the function eliminating support for the feature from the modified ECMAScript engine.

The preceding examples only describe one embodiment of implementing the configuration data. Another approach is to use C language #define directives. For example, if isNaN is unused:
define kGlobal_isNaN 0
If isNaN is used: #define kGlobal_isNaN 1
The implementation of fx_Number_isNaN becomes:
void fx_Number_isNaN(xsMachine *the)
{
if kGlobal_isNaN
. . . implementation of isNaN goes here
else
fxDeadStrip(the);
endif
}

This approach uses the compiler's preprocessor to exclude the unused code instead of depending on the linker. Both approaches take place during the build process.

Coding Practices

ECMAScript is inherently a dynamic language. Applications can use features of the ECMAScript engine thru forms that escape analysis 110.

For example, applications can access methods using strings. Consider the following three lines, which are equivalent calls to the add method of this.
this.add(1, 2);
this["add"] (1, 2);
this[("AD"+"D").toLowerCase( )](1, 2);

Depending on the sophistication of the parse tree analysis, all of these forms are possible to fully resolve. Fortunately, nearly all code uses the first form. The following is far more complicated:
let names=["add", "subtract", "multiply", "divide"];
this[names[Math.random( )*4]](1, 2);

And some forms are not detected by embodiments of the analysis 110 described above. For example, operations involve eval or any way to execute scripts or require modules that were not part of analyzed application code 220 may be problematic.

The consequence of this is that applications processed by these embodiments should ideally conform to certain coding practices. In other embodiments, certain coding processes such as these can be identified during script analysis to alert the developer. In other embodiments, support for these language features can be removed completely (stubbed out) or replaced by other operations or op-codes according to desired behavior by implementers.

In some embodiments, code determined to be unused can be replaced with a stub that reports a "dead strip" error at runtime. Embodiments using stubs to return a "dead strip" error may help maintain the integrity of the ECMAScript engine: the stub might be used to communicate the difference between an incomplete implementation and a stripped implementation to applications that do not conform to the desired coding practices above.

In any event, it is desired that coding practices or circumstances not incur any unrecoverable errors to avoid adverse user experience on the device during runtime.

Alternative Embodiment—Configuration Options

In an alternative embodiment of the present invention, as shown in FIG. 2, the analysis phase 101 may accept optional input in certain circumstances specified by configuration options 290.

Object removal—One optional input for the configuration options 290 in an embodiment of the present invention is an explicit instruction to remove a particular built-in function. For instance the analysis performed can determine that a method named match is used, but both the Array and RegExp classes have match method. The developer may know that only Array.prototype.match is used, and so can instruct the script analysis 110 to consider RegExp.prototype.match unreferenced and consequently eligible for removal.

Object inclusion—Another optional input which may be specified in the configuration options 290 in yet another embodiment of the present invention is an explicit instruction to keep or include a particular object, class, or function, even though it is not referenced by the application. This is done to create a custom ECMAScript engine for applications that expect to receive and execute scripts or modules built separately from the application itself. This is done, for example, to update individual modules and to install third party software. An application built to host such scripts should document which features of the ECMAScript language are available in the ECMAScript engine. The foregoing analysis and configuration processes will be modified accordingly in certain embodiments of the present invention.

Thus, a more efficient memory usage scheme for an execution environment and automatic generation of the same has thus been described. While the invention has been described with reference to numerous specific details, one of ordinary skill in the art will recognize that the invention can be embodied in other specific forms without departing from the spirit or the scope of the invention. Thus, one of ordinary skill in the art would understand that the invention is not to be limited by the foregoing illustrative details, but rather is to be defined by the appended claims.

What is claimed is:

1. An automatic method performed in a computer system comprising the following steps:
   a) analyzing application code to determine excluded features of a scripting language execution environment corresponding to unused features of the scripting language execution environment unused in application code, wherein the application code is ECMAScript, the excluded features including at least one object of the execution environment of the scripting language execution environment including at least one object of the scripting language execution environment, wherein the scripting language execution environment is configured to execute the ECMAScript interpretive language;
   b) configuring a build process to exclude excluded features of the scripting language execution environment corresponding to the unused features of the scripting language execution environment unused in the application code; and
   c) building a modified scripting language execution environment for the application code without the excluded features of the scripting language execution environment corresponding to the unused features of the scripting language execution environment unused in the application code.

2. The method of claim 1 further comprising:
   a) loading the application code and the modified scripting language execution environment into a deployment device.

3. The method of claim 1 wherein the excluded features further comprise at least one of the following:
   a) a function;
   b) a class; and
   c) a language construct.

4. The method of claim 3 wherein the excluded features further comprise at least one of the following:
   a) a module; and
   b) a virtual machine op-code.

5. The method of claim 1 wherein the step of configuring comprises:
   a) generating a configuration file which specifies the excluded features of the scripting language execution environment.

6. The method of claim 5 wherein the step of building comprises:
   a) reading the configuration file and building the executable form without the excluded features of the scripting language execution environment as specified by the configuration file.

7. The method of claim 6 wherein the 1 configuration file comprises command line options.

8. The method of claim 5 wherein the configuration file comprises:
   a) source code.

9. The method of claim 8 wherein the source code comprises:
   a) at least one directive to exclude any unused module of the scripting language execution environment.

10. The method of claim 1 wherein the step of configuring comprises:
    a) generating a configuration file which is used to build the modified scripting language execution environment.

11. The method of claim 10 wherein the step of building the modified scripting language execution environment comprises the step of:
    a) building the modified scripting language execution environment using the configuration file.

12. The method of claim 1 further comprising the step of:
    a) receiving input to include specified objects in the modified scripting language execution environment; and
    b) wherein the step of building the modified scripting language execution environment comprises the step of including the specified objects in the modified scripting language execution environment.

13. The method of claim 1 further comprising the step of:
    a) receiving input to exclude specified objects in the modified scripting language execution environment; and
    b) wherein the step of building the modified scripting language execution environment comprises the step of excluding the specified objects in the modified scripting language execution environment.

14. A computer readable product comprising the modified scripting language execution environment for storage in a deployment device formed by the method of claim 1.

15. The computer readable product of claim 14 further comprising the application code for storage in a deployment device.

16. The computing device of claim 1 wherein the configuration generator further comprises:
    a) a generator for generating a configuration file which specifies the excluded features of the scripting language execution environment.

17. The computing device of claim 16 wherein the builder further comprises:
    a) a reader for reading the configuration file and building the executable form without the excluded features of the scripting language execution environment as specified by the configuration file.

18. The computing device of claim 17 wherein the configuration file comprises:
    a) source code.

19. The computing device of claim 18 wherein the source code comprises:
    a) at least one directive to exclude any unused module of the scripting language execution environment.

20. The computing device of claim 18 wherein the configuration generator further comprises:
    a) a generator for generating a configuration file which is used to build the modified scripting language execution environment.

21. The computing device of claim 16 wherein the configuration file comprises command line options.

22. The computing device of claim 1 further comprising:
    a) a receiver for receiving input to cause the configuration generator to include specified objects in the modified scripting language execution environment; and
    b) wherein the builder further comprises a configurator for building the modified scripting language execution environment with the specified objects.

23. The computing device of claim 1 further comprising:
    a) a receiver for receiving input to cause the configuration generator to exclude specified objects in the modified scripting language execution environment; and
    b) the builder further comprising a remover for building the modified scripting language execution environment without the specified objects.

24. A computing device comprising:
a) a central processing unit (CPU);
b) an analyzer for processing and determining excluded features of an scripting language execution environment corresponding to unused features of the scripting language execution environment unused in application code, wherein the application code is ECMAScript, the excluded features of the scripting language execution environment including at least one object of the scripting language execution environment, wherein the scripting language execution environment is configured to execute the ECMAScript interpretive language;
c) a configuration generator coupled to the analyzer for configuring a builder to exclude the excluded features of the scripting language execution environment corresponding to the unused features of the scripting language execution environment unused in the application code; and
d) the builder coupled to the configuration generator for building a modified scripting language execution environment for the application code without the excluded features of the execution environment corresponding to the unused features of the scripting language execution environment unused in the application code.

25. The computing device of claim 24 wherein the builder further comprises:
a) an excluder for excluding the excluded features of the 2 scripting language execution environment; and
b) a performer for building the modified scripting language execution environment into an executable form without the excluded features of the scripting language execution environment.

26. The computing device of claim 25 wherein the excluded features further comprise at least one of the following:
a) a function;
b) a class; and
c) a language construct.

27. The computing device of claim 26 wherein the excluded features further comprise at least one of the following:
a) a module; and
b) a virtual machine op-code.

* * * * *